United States Patent [19]

DePuy et al.

[11] 4,285,746

[45] Aug. 25, 1981

[54] METHOD OF DECORATING SEASONAL ORNAMENTS

[75] Inventors: Ronald G. DePuy, Corning; George W. Stevens, Elmira, both of N.Y.

[73] Assignee: Corning Glass Works, Corning, N.Y.

[21] Appl. No.: 609,076

[22] Filed: Aug. 29, 1975

Related U.S. Application Data

[63] Continuation-in-part of Ser. No. 360,952, May 16, 1973, abandoned.

[51] Int. Cl.³ .................. B32B 5/18; B32B 1/00; B29C 27/00
[52] U.S. Cl. .................. 156/79; 156/86; 156/265; 156/277; 156/279; 156/320; 264/46.9; 264/230; 264/342 R; 428/11; 428/90; 428/315; 428/913
[58] Field of Search ................ 156/84–86, 156/160, 165, 214, 215, 256, 277, 278, 279, 293, 294, 303, 59, 83, 320, 77, 79, 264, 265, 297; 215/12 R, 12 A; 206/497; 264/230, 342 R, 342 RE, 46.9, 46.7, 46.4; 428/11, 910, 913, 90, 315

[56] References Cited

U.S. PATENT DOCUMENTS

| | | | |
|---|---|---|---|
| 2,220,568 | 11/1940 | Fishel | 428/11 |
| 2,327,519 | 8/1943 | Groothedde | 428/11 X |
| 2,353,853 | 7/1944 | Sayford | 428/11 |
| 2,719,374 | 10/1955 | Paione | 428/11 |
| 2,784,512 | 3/1957 | Goodwin | 428/11 X |
| 3,093,448 | 6/1963 | Kirkpatrick et al. | 156/86 UX |
| 3,110,554 | 11/1963 | Yazumi | 156/85 |
| 3,382,121 | 5/1968 | Sherlock | 156/86 X |
| 3,442,736 | 5/1969 | Duns | 156/85 |
| 3,523,052 | 8/1970 | Bolen | 156/86 X |
| 3,542,229 | 11/1970 | Beyerlein et al. | 156/86 X |
| 3,654,017 | 4/1972 | Ropiequet et al. | 156/251 |
| 3,764,453 | 10/1973 | Ropiequet et al. | 156/85 X |
| 3,829,348 | 8/1974 | Spiegel et al. | 156/86 X |

*Primary Examiner*—William A. Powell
*Assistant Examiner*—Thomas E. Bokan
*Attorney, Agent, or Firm*—Burton R. Turner

[57] ABSTRACT

A tubular band of pre-decorated heat shrinkable material is positioned over the bulbous or central portion of a seasonal ornament and the ornament-band assembly is then subjected to a heat source and the band is permanently shrunk onto the outer surface of the ornament, thus providing a surface decoration therefore.

2 Claims, 3 Drawing Figures

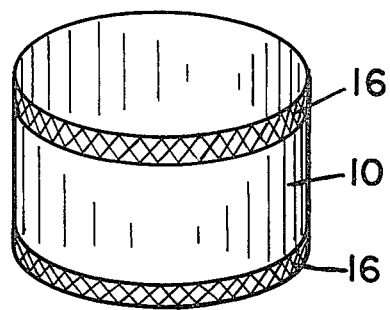
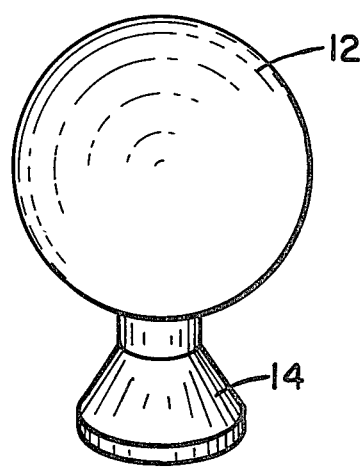
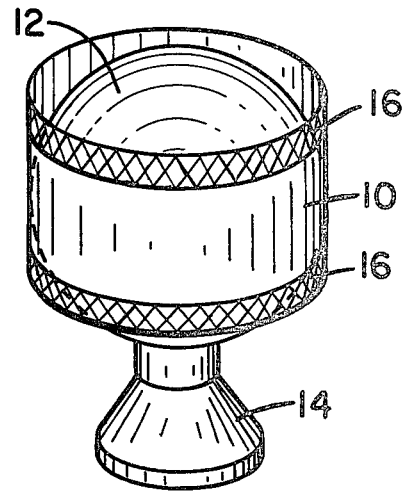
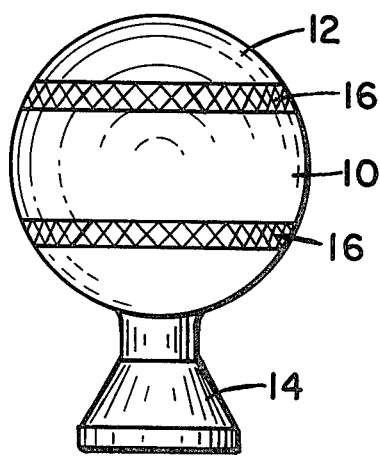
Fig. 1  Fig. 2  Fig. 3

METHOD OF DECORATING SEASONAL ORNAMENTS

This application is a continuation-in-part of application Ser. No. 360,952 filed May 16, 1973, now abandoned.

BACKGROUND OF THE INVENTION

The present invention pertains to the decoration of seasonal ornaments, and more particularly to a method of readily providing the outer surface of seasonal ornaments with a variety of surface decorations.

In the past, seasonal ornaments have usually been decorated by hand or through the utilization of conventional methods including the use of striping machines and silk screening machines. Neither of these known methods of decorating ornaments has been completely satisfactory, since silk screening not only requires the placement of the screen on the surface to be decorated, but also requires the application of pigments or paints which must be dried in order to avoid smearing. Further, when utilizing multicolor decorations, it is necessary to accurately register subsequent screens on the ornament which may be rather difficult due to the ornament's compound surface. Finally, the decorations which could be applied by striping machines were materially limited to multi-width bands or the like.

It is known in the prior art to apply shrink film bands about the cylindrical walls of bottles and cans for labeling, strengthening and sealing such containers. However, the shrink films of the container art have merely replaced the older adhesively-applied paper labels. That is, in the container art, there has merely been a substitution of a printed shrink film label for a printed paper label, rather than a new concept of decoration. Such labeling art has not been concerned with the problems encountered in decorating a fragile spherical body such as a Christmas tree ornament wherein the application of the printed decoration must be carefully controlled for both aesthetic and mechanical reasons so that the orientation and aethetics of the decoration are pleasing and so that the integrity of the frangible spherical body is preserved.

The present invention overcomes the problems encountered with the previously known methods of decoration, by utilizing a pre-decorated band which is placed on the ornament with a finished decoration, thus eliminating the problems of registration of colors and those inherent with the wet pigments of silk screening and striping machines. Further, since the band is pre-printed while in an easily handleable state, there is virtually no limit to the decoration which can be utilized, such as process printed designs including full color illustrations.

SUMMARY OF THE INVENTION

Whereas the prior art concepts have suggested the utilization of shrink films for packaging, protective coverings, and labeling, the present invention sets forth a novel approach for decorating and strengthening ornaments. A tubular band of unshrunk but heat shrinkable material, such as polyvinyl chloride, containing a preprinted decoration, is positioned about a major circumference of the outer surface of an ornament so as to extend transversely on opposite sides thereof, and the ornament and band assembly are then subjected to heat so as to shrink the band to a skin tight fit about the outer surface of the ornament. Once the bank has been shrunk onto the outer surface of the ornament, it permanently retains its shape and cannot be re-expanded or removed therefrom without materially destroying the ornament. Accordingly, the present invention provides a method for easily producing and reproducing a variety of surface decorations that may be processed printed and applied to seasonal ornaments, and which readily lends itself to automation.

It thus has been an object of the present invention to eliminate the problems heretofore encountered with conventional decorating methods and provide a method of readily applying virtually any desired surface decoration to the curved surface of a seasonal ornament, while simultaneously providing added resistance to breakage.

BRIEF DESCRIPTION OF THE DRAWINGS

FIG. 1 is a somewhat schematic illustration showing a pre-printed tubular band of heat shrinkable material about to be positioned upon the outer surface of a seasonal ornament.

FIG. 2 illustrates the ornament of FIG. 1 with the heat shrinkable band in position about the outer surface of the ornament.

FIG. 3 illustrates the band after it has been heat shrunk upon the ornament to provide an outer surface decoration.

DESCRIPTION OF THE PREFERRED EMBODIMENTS

Referring now to the drawings, and particularly FIG. 1, a band of seamless tubing 10 is shown about to be positioned over an ornament 12 to be decorated. Although a spherical ornament is shown, retaining its moil 14 as a support or pedestal, it will be appreciated that the ornament may be of virtually any desired configuration.

The band 10 may be formed from a seamless tubing of heat shrinkable material such as polyvinyl chloride which has been cut transversely to form bands 10 of desired height or length. Preferably the tubing from which the bands 10 are formed, is made from oriented polyvinyl chloride which is enlarged or pre-expanded principally in its width during manufacture so that the film will shrink tightly about the minor circumferences, and which is in an expanded or unshrunken form when the bands 10 are cut therefrom. In addition, the tubing of polyvinyl chloride is pre-printed with desired surface decorations along its extent prior to being cut into band lengths, each containing a desired decoration.

As shown in FIG. 2, the expanded or unshrunken band 10 is positioned over a major circumference of the outer surface of the ornament 12 with portions of the band extending transversely of the major circumference so that opposite portions abound minor circumferences. The band may be temporarily retained in position thereon through frictional contact. The ornament and band assembly is then passed through a heat tunnel so as to apply heat at about 285° F. for a fraction of a minute or about two to five seconds and thereby activate the molecular memory of the polyvinyl chloride band resulting in an instantaneous return to a pre-expanded diameter about the outer surface of the ornament 12 with the band forming a smooth film over its entire extent, including both the major and minor circumferences. When contracting or shrinking, the band assumes the shape of the ornament being covered, and this shape is permanently retained by the band after the heat is removed.

As shown in FIG. 3, the shrunken band 10 not only provides a smooth wrinkle-free attractive surface decoration with proper orientation for the ornament 12, but also a compressive protective band which enhances impact resistance and retards detrimental surface abrasion of the frangible ornament.

If desired, decorative braids 16 may be applied to the polyvinyl chloride band 10 before it is shrunk, and accordingly the band then acts as a carrying device to transform the decorative braid onto the minor circumference of the ornament, as shown at 16 on FIG. 3. It will be apparent that this technique is also adaptable to the decoration of ornaments having shapes other than spherical. Further the areas 16 on band 10 could represent heat-activated adhesives which are activated when the assembly is passed through the heat tunnel, so that decorative material such as glitter or flocking may readily be applied to the activated adhesive areas, without adhering to adjoining areas. Virtually any of the heat-activated polymeric adhesive coatings which are based on thermoplastic hot melt adhesives such as polyamides, vinyl acetates, polyethylenes, etc. may be utilized. Such a suitable heat-activated adhesive is produced by the Pierce and Stevens Chemical Corporation and identified as A7429X.

The polyvinyl chloride tubing, from which the bands 10 are formed, may be produced in a wide range of colors, or it may be clear or opaque. In addition the tubing can be printed with multi-colored decorations or as a single colored image as desired. In fact, the tubing could be printed with a thermally expandable coating so that upon being activated in the heat tunnel, the printed coating will be activated and rise up as a three dimensional decoration. Expandable or foamable coating materials which may be printed on the tubing include those products produced by Pierce and Stevens Chemical Corporation and described in their brochure bearing number D0306 and entitled "FOAMCOAT". Of course other suitable foaming printing inks may also be utilized. Although virtually any shrinkable polyvinyl chloride band may be utilized, we prefer to use bands made from oriented polyvinyl chloride.

As a specific example, but by no means limiting in nature, a band about 3" long of oriented polyvinyl chloride having a diameter of approximately $3\frac{1}{4}$" was cut from a pre-printed tube of such material. The band was positioned over a spherical ornament having a diameter of $3\frac{1}{4}$" which was supported by its moil. The ornament and band assembly were then passed through a heat tunnel maintained at a temperature of about 270° F. to 285° F. for a period less than a minute or about 4 to 5 seconds. When the ornament and band assembly emerged from the tunnel the band had shrunken to the shape of the ornament and formed a wrinkle-free protective, attractive decoration thereon.

Although we have disclosed the now preferred embodiments of our invention, it will be apparent to those skilled in the art that various changes and modifications may be made thereto without departing from the spirit and scope thereof as defined in the appended claims.

We claim:

1. An improved method of simultaneously decorating seasonal ornaments and applying a protective band thereto comprising the steps of applying a heat-activated adhesive along portions of the outer surface of a tube of heat shrinkable material, cutting said tube of heat shrinkable material transversely of its longitudinal extent into a plurality of tubular bands each having heat-activated adhesive thereon, positioning one of said tubular bands about the outer surface of a curvilinear seasonal ornament to be decorated, applying heat to said ornament and said band and heat shrinking said band about the outer surface of said ornament while simultaneously activating said heat-activated adhesive, and applying decorative material to said heat activated adhesive after said band has formed a shrink fit on said ornament to adhere such decorative material only upon those portions of the band having said heat-activated adhesive.

2. An improved method of simultaneously decorating seasonal ornaments and applying a protective band thereto comprising the steps of applying a thermally expandable coating along the outer surface of a tube of heat shrinkable material, cutting said tube of heat shrinkable material transversely of its longitudinal extent into a plurality of tubular bands each having a thermally expandable coating thereon, positioning one of said tubular bands about the outer surface of a curvilinear seasonal ornament to be decorated, applying heat to said ornament and band and simultaneously heat shrinking said band about the outer surface of said ornament while expanding said coating on said band to provide a protective surface on said ornament with a three dimensional decoration.

* * * * *